3,328,361
TRIMETHYLENE SULFIDE POLYMERS
James T. Edmonds, Jr., Bartlesville, Okla., assignor to Phillips Petroleum Company, a corporation of Delaware
No Drawing. Filed Sept. 23, 1963, Ser. No. 310,863
13 Claims. (Cl. 260—79)

This invention relates to trimethylene sulfide polymers and their preparation. In another aspect, it relates to a novel process for polymerizing trimethylene sulfides. In another aspect, it relates to a novel process for copolymerizing trimethylene sulfides and polymerizable vinyl-substituted comonomers. In a further aspect, it relates to the copolymers so produced as novel compositions of matter.

Many different processes have been proposed or patented for the production of different types of resinous, plastic and elastomeric polymers and a host of such polymers are now in widescale commercial production. I have now discovered that valuable polymers can be produced by polymerizing trimethylene sulfides in the presence of catalytic amounts of organo-alkali metal polymerization catalysts, such as n-butyllithium. In another embodiment, I have discovered a novel process wherein trimethylene sulfides and polymerizable vinyl-substituted comonomers, such as styrene, can be copolymerized in the presence of catalytic amounts of organo-alkali metal polymerization catalysts to produce novel copolymers.

The trimethylene sulfides (or thiacyclobutanes) which are homopolymerized, or copolymerized with a vinyl-substituted comonomer, according to this invention can be represented by the general formula:

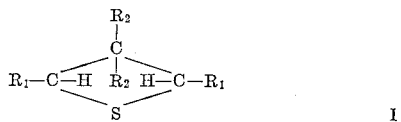

where $R_1$ and $R_2$ are radicals selected from the group consisting of hydrogen and alkyl, aryl, and cycloalkyl radicals, and combinations of said radicals, such as alkaryl, aralkyl, alkylcycloalkyl, arylcycloalkyl, cycloalkylalkyl, cycloalkylaryl, arylcycloalkylalkyl, and the like. $R_1$ and $R_2$ can contain substituent groups that are inert or unreactive in the polymerization reaction of this invention, though I prefer to employ hydrocarbon radicals as $R_1$ and $R_2$ without such substituent groups. Also, where $R_1$ is an alkyl or aralkyl radical, I prefer that such radical be a primary or secondary radical since the corresponding trimethylene sulfides will be easier to prepare in good yields. And, I prefer that where $R_1$ and $R_2$ are hydrocarbon radicals that the number of carbon atoms in each be in the range of 1 to 10, inclusive, and that the total number of carbon atoms in the trimethylene sulfide compound does not exceed 15.

The trimethylene sulfides and their preparation are known in the prior art, and the simplest member of this class, viz., trimethylene sulfide (or thiacyclobutane), is the preferred member of the class to be used in making the polymers of this invention, especially since it is presently commercially available. This latter compound can be prepared by the reaction of 1,3-dichloro- or 1,3-dibromopropane with sodium sulfide. Another method of preparing it, and other members of the class, is by reacting a 3-chloropropyl mercaptan with a base such as sodium hydroxide.

Representative trimethylene sulfides coming within the scope of Formula I which can be used in the practice of this invention include:

trimethylene sulfide,
2-methyltrimethylene sulfide,
3-methyltrimethylene sulfide,
2,3-dimethyltrimethylene sulfide,
2,4-dimethyltrimethylene sulfide,
3,3-dimethyltrimethylene sulfide,
2,3,4-trimethyltrimethylene sulfide,
2,3,3,4-tetramethyltrimethylene sulfide,
2-ethyltrimethylene sulfide,
3-ethyltrimethylene sulfide,
3,3-diethyltrimethylene sulfide,
3-methyl-3-ethyltrimethylene sulfide,
2-methyl-3,3-diethyltrimethylene sulfide,
2-methyl-4-n-butyltrimethylene sulfide,
2,4-di-n-hexyltrimethylene sulfide,
2-sec-decyltrimethylene sulfide,
2-ethyl-3-sec-decyltrimethylene sulfide,
2-cyclopentyltrimethylene sulfide,
3-cyclohexyltrimethylene sulfide,
2,4-dicyclohexyltrimethylene sulfide,
2-(4-methylcyclohexyl)trimethylene sulfide,
2-phenyltrimethylene sulfide,
3-p-tolyltrimethylene sulfide,
2-(4-n-butylphenyl)trimethylene sulfide,
2-benzyl-3-tert-butyltrimethylene sulfide,
2-(3-cyclopentylphenyl)trimethylene sulfide,
2-methyl-3-isopropyl-4-p-tolyltrimethylene sulfide,
2-(3-phenylcyclopentyl)methyltrimethylene sulfide,
2-naphthyltrimethylene sulfide.

and the like, including mixtures thereof.

As mentioned above, the trimethylene sulfides can be copolymerized with a polymerizable vinyl-substituted compound. The latter compounds include conjugated dienes, such as those having 4 to 12 carbon atoms per molecule, and compounds which can be represented by the general formula:

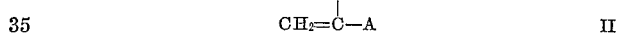

where $R_3$ is selected from the group consisting of hydrogen, lower alkyl (e.g., methyl, ethyl, propyl, etc.) and chloro, and A is selected from the group consisting of carboxy, cyano, carbamyl, carboalkoxy (e.g., carbomethoxy, carboethyloxy, carbopropoxy, etc.) and the radicals:

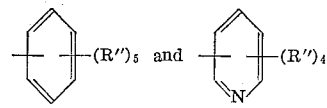

where R″ is selected from the group consisting of hydrogen, vinyl, halogen and lower alkyl.

Representative conjugated dienes which can be copolymerized with any one of the above-mentioned trimethylene sulfides include: 1,3-butadiene, isoprene, 2,3-dimethyl-1,3-butadiene, 1,3-pentadiene (piperylene), 2-methyl-3-ethyl-1,3-butadiene, 3-methyl-1,3-pentadiene, 2-methyl-3-ethyl-1,3-pentadiene, 2-ethyl-1,3-pentadiene, 1,3-hexadiene, 2-methyl-1,3-hexadiene, 1,3-heptadiene, 3-methyl-1,3-heptadiene, 1,3-octadiene, 2-chloro-1,3-butadiene, 3-butyl-1,3-octadiene, 3,4-dimethyl-1,3-hexadiene, 3-n-propyl-1,3-pentadiene, 4,5-diethyl-1,3-octadiene, 2-phenyl-1,3-butadiene, 2,3-diethyl-1,3-butadiene, 2,3-di-n-propyl-1,3-butadiene, 2-methyl-3-isopropyl-1,3-butadiene, and the like, and mixtures thereof.

Representative vinyl-substituted compounds coming within the scope of Formula II which can be copolymerized with any one of the above-mentioned trimethylene sulfides, or copolymerized with the latter and any one of the abovementioned conjugated dienes, include: styrene, alpha-methylstyrene, 4-methylstyrene, 3-chlorostyrene, 4-ethylstyrene, 3-n-butylstyrene, 4-isopropylstyrene, 4-bromostyrene, 4-tert.-butylstyrene, and divinyl benzene; unsaturated aliphatic carboxylic acids, such as acrylic acid, methacrylic acid, ethacrylic acid, propacrylic acid, 2-chloroacrylic acid, etc.; nitriles, such as acrylonitrile, ethacrylonitrile, etc.; the corresponding amides, such as acrylamide, methacrylamide, ethacrylamide, etc.; esters, such as methyl acrylate, ethyl acrylate, propyl acrylate, butyl acrylate, methyl methacrylate, ethyl methacrylate, propyl methacrylate, butyl methacrylate, methyl ethacrylate, ethyl ethacrylate, methyl 2-chloroacrylate; heterocyclic nitrogen compounds, such as 2-vinylpyridine, 2-methyl-5-vinylpyridine, etc.; and the like.

Where the trimethylene sulfide is copolymerized with one or more vinyl-substituted comonomers, such as 1,3-butadiene and styrene, the copolymers formed can be random copolymers or block copolymers, or combinations of the two within the same molecule, that is, a block copolymer where one of the blocks is a random copolymer. In preparing the random copolymers, the various monomers are all charged at the same time to the polymerization reactor. In preparing the block copolymers, one or more of the vinyl-substituted comonomers can be charged initially, allowing the same to polymerize, and then the trimethylene sulfide can be charged, allowing the latter to polymerize. Alternatively, the trimethylene sulfide can be charged and polymerized first and the vinyl-substituted comonomer(s) thereafter, to form block copolymers. In any case, where such random or block copolymers are prepared, the trimethylene sulfide will usually make up from 10 to 90 weight percent of the copolymer, and where the vinyl-substituted comonomers make up the rest of the copolymer.

The organo-alkali metal polymerization catalysts used in this invention can be represented by the general formula $R'M_n$, where $R'$ is an organo radical, M is an alkali metal, such as lithium, sodium, potassium, cesium, and rubidium, and $n$ is an integer of from 1 to 4, inclusive. For example, when $n$ is 1, R can be an organo radical such as an alkyl, cycloalkyl, alkenyl, alkynyl, cycloalkenyl, or aryl radical, or combinations of such radicals, such as alkylcycloalkyl, cycloalkylaryl, alkylcycloalkenyl, alkylaryl, arylalkyl, alkenylaryl, cycloalkylaryl, etc., and $R'$ can be a corresponding di-, tri- or tetravalent organo radical when $n$ is 2, 3, or 4 respectively. The $R'$ in the general formula for the catalyst will generally have 1 to 20 carbon atoms, although a higher number of carbon atoms can be used. $R'$ can contain substituent groups that are unreactive under the conditions employed, though I prefer to employ hydrocarbon radicals as $R'$ without such substituent groups.

The organo-alkali metal catalysts and their preparation are well known in the polymerization art and any of those used heretofore, for example in the polymerization of 1,3-butadiene, can be employed in the polymerization process of this invention. The preferred organo-alkali metal catalyst is one where M is lithium and $n$ is 1 to 2, the mono- and dilithio-substituted compounds being preferred as the polymerization catalyst or initiators of this invention. The most preferred catalyst is n-butyllithium, especially since it is commercially available. The monolithium-substituted compounds can be prepared by reacting lithium metal with halogen-containing mono- and polycyclic aromatic compounds, including condensed ring aromatics and polyphenyls. The monolithium compounds can also be obtained by the reaction of lithium with halogen-containing polyaryl-substituted methanes. Polylithium-substituted compounds can be obtained by reaction of lithium metal with mono- and polycyclic aromatic compounds containing two or more halogen atoms per molecule, including condensed ring aromatics and polyphenyls. Another group of polylithium-substituted compounds which can be employed are those prepared by reacting lithium metal with halogen-containing polyaryl-substituted ethylenes. Other polylithium substitution compounds can be obtained from the reaction of lithium with halogen-containing aliphatic and cycloaliphatic compounds containing 4 to 12 carbon atoms per molecule. Polycyclic aromatic compounds or polyaryl-substituted ethylenes form adducts or direct reaction products with the lithium metal and such products can also be used as polymerization catalysts in this invention.

Representative organo-alkali metal compounds of lithium which can be employed as polymerization catalysts in this invention include: methyllithium, isopropyllithium, n-butyllithium, tert-octyllithium, n-decyllithium, phenyllithium, 2-naphthyllithium, 1-lithionaphthalene, 2-lithionaphthalene, 4-butylphenyllithium, p-tolyllithium, 4-phenylbutyllithium, cyclohexyllithium, 4-butylcyclohexyllithium, 4-cyclohexylbutyllithium, 3-propyl-5-pentyl-1-lithio-2,4,6-trimethylbenzene, 4-lithiobiphenyl, 4-lithio-p-terphenyl, lithiotriphenylmethane, lithiodiphenylmethane, lithio(di-2-naphthyl)methane, dilithiomethane, dilithiostilbene, 1,4-dilithiobutane, 1,6-dilithiohexane, 1,4-dilithio-2,4,6-trimethylhexane, 1,10-dilithiodecane, 1,20-dilithioeicosane, 1,4-dilithiocyclohexane, 9,10-dilithioanthracene, 9,10-dilithiophenanthrene, 1,4-dilithiomethylnaphthalene, 1,2-dilithio-1,1-diphenylethane, 1,2-dilithiotetraphenylethane, 1,2-dilithio-1-phenyl-2(1-naphthyl)ethane, 1,4-dilithio-2-butene, 1,4-dilithio-2-methyl-2-butene, 1,8-dilithio-3-decene, 1,3-dilithiopropyne, 1,3-dilithiobutyne-1, 1,3-dilithio-3-methylpentyne-1, 1,3-dilithio-3-cyclopentylpropyne, 1,3-dilithio-3,3-diphenylpropyne, 1,3-dilithio-3,3-bis(p-tolyl)propyne, 1,3-dilithio-3-(4-cyclohexylphenyl)butyne-1, 1,4-dilithiobenzene, 1,5-dilithionaphthalene, 1,3-dilithioanthracene, 1,2-dilithio-1,2-diphenylethane, 1,5-dilithiophenanthrene, 9,10-dilithio-9,10-dihydroanthracene, 4,4'-dilithiobiphenyl, 1,2-dilithio-1,8-diphenyloctane, -1,3,5-trilithiopentane, -1,5,15-trilithioeicosane, 1,3,5-trilithiocyclohexane, 1,3,5-trilithiobenzene, 1,-2,5-trilithionaphthalene, 1,3,5-trilithioanthracene, 1,3,5,8-tetralithiodecane, 1,5,10,20-tetralithioeicosane, 1,2,4,6-tetralithiocyclohexane, 1,2,3,5-tetralithio-4-hexylanthracene, and the like. Corresponding organo-alkali metal compounds of sodium, potassium, cesium, and rubidium can also be employed as polymerization catalysts in this invention, as well as 4-butylphenylsodium, 4-cyclohexylbutylpotassium, isopropylrubidium, 4-phenylbutylcesium, 1,5-dipotassiopentane, 1,4-disodio-2-methylbutane, 1,4-dipotassio-2-butene, 1,4-dirubiodiobutane, 1,8-dicesiooctane, 1,3-disodiopropyne, 1,3-dipotassio-3-methylbutyne-1, 1,3-dirubidio-3-ethylpentyne-1, 1,3-dicesio-3-propyl-6-methylheptyne-1, and the like.

The amount of the organo-alkali metal compound employed as a polymerization catalyst in this invention can very over a rather wide range, and functionally this amount can be expressed as a catalytic amount. In general, the amount of catalyst used will be from 0.25 to 100 millimoles per 100 grams of the trimethylene sulfide charged to the reaction zone. The particular amount of catalyst employed will depend upon the particular monomers used and the desired molecular weight, inherent viscosity, or other desired properties of the polymer product.

Although the polymerization reaction of this invention can be carried out in the absence of a diluent, I prefer to use a diluent. Such a diluent will be inert and one which is liquid under the conditions of operation. Where a diluent is used, the one chosen will be the one in which the monomers are soluble, though the catalyst and polymerization product need not be soluble in the diluent. Representative diluents which can be employed in the practice of this invention include aliphatic monoethers of the formula R—O—R, where each R is an alkyl group having 2 to 12 carbon atoms, such as diethyl ether, di-n-propyl ether, di-sec-butyl ether, diisopropyl ether, ethyl isopropyl ether, ethyl n-butyl ether, ethyl tert-butyl ether, di-n-butyl ether, isopropyl tert-butyl ether, n-propyl n-butyl ether, di-n-amyl ether, diisoamyl ether, di-n-hexyl ether, di-(2-ethylhexyl)ether, dioctyl ether, isopropyl octyl ether, ethyl dodecyl ether, di-tert-butyl ether, di(2,4,6-trimethyloctyl) ether, and the like. Aliphatic polyethers such as ethylene glycol dimethyl ether, and diethylene glycol dimethyl ether can be used, and also cyclic ethers such as p-dioxane, and tetrahydrofuran. Also useful in some cases are thioethers and tertiary amines, such as diethyl sulfide, diisopropyl sulfide, ethyl isopropyl sulfide, ethyl n-propyl sulfide, triethyl amine, isopropyl diethyl amine, di-n-propylethyl amine, and the like. Hydrocarbon diluents which can be used representatively include isobutane, n-pentane, isooctane, n-dodecane, cyclopentane, cyclohexane, methylcyclohexane, benzene, toluene, xylene, naphthalene, kerosene, and the like. N-alkylated amides such as dimethylformamide and N-methylpyrrolidone can also be employed as diluents. The amount of diluent used can vary and generally will be in the range from 10 to 90 weight percent of the monomer-diluent mixture. In many cases it will be desirable to dissolve or disperse the polymerization catalyst or initiator in a diluent like or different from that employed in the polymerization reaction.

The process of this invention can be carried out as a batch process by charging the monomeric materials into a reactor containing the organo-alkali metal catalyst and solvent (where used). The process can also be practiced in a continuous manner by maintaining the desired concentrations of reactants in the reactor for a suitable residence time, which can vary within wide limits and will be dependent on such variables as reaction temperature, pressure, amount of catalyst used, and the particular monomeric materials which are being polymerized, but generally will be in the range of a few minutes to 100 hours, though generally less than 24 hours, the shorter reaction times being required at higher temperatures. Polymerization can be carried out at any temperature within the range of −80 to 150° C., preferably within the range of 0 to 75° C. The polymerization reaction can be carried out under autogenous pressures. It is usually desirable to operate at pressures sufficient to maintain the monomeric materials substantially in the liquid phase. The pressure will thus depend upon the particular materials being polymerized, the solvent mixture being employed, and a temperature at which the polymerization is carried out. However, higher pressures can be employed, if desired, these pressures being obtained by some such suitable method as the pressurization of the reactor with a gas which is inert with respect to the polymerization reaction. Various materials which are deleterious to the organo-alkali metal catalysts should be excluded from the reaction system, such as carbon dioxide, oxygen and water, as an inert atmosphere such as nitrogen can be used in the reaction system to prevent poisoning or inactivation of the catalyst.

Following polymerization, the polymer can be recovered by several methods. The trimethylene sulfide polymer is generally insoluble in all of the above specified diluents, and will precipitate out of the diluent as formed. Thus, the polymer can be separated from the reaction mixture by such methods as filtration, decantation, centrifugation, and the like. After separating the polymer from the reaction mixture, it is advantageous to wash the polymer with a suitable washing medium such as methanol or ethanol. This washing step serves to remove occluded diluent and catalyst, thus providing a pure polymer.

The polymers produced according to this invention will range from soft, oily resinous materials to highly elastomeric materials to highly crystalline materials, depending upon the monomeric material polymerized and the conditions of polymerization. The polymers can be treated with an oxidizing agent, such as peroxygen compounds like hydrogen peroxide, performic acid, peracetic acid, perbenzoic acid, and the like, to increase their melting points, and the polymers can be blended with other polymers, such as 1-olefin polymers, to improve the properties of the latter, such as dyeability. Antioxidants, pigments, extenders, plasticizers, cross-linking agents, and other additives can be incorporated into the polymers. The polymer products of this invention can be molded, extruded, etc., and are useful in a variety of applications, such as in films, fibers, pipes, containers. Other uses for these polymers will become obvious to those skilled in the art.

The objects and advantages of this invention are further illustrated in the following examples, but it should be understood that the various materials, conditions and other details recited in these examples should not be construed to unduly limit this invention.

*Example I*

A beverage bottle was charged with 100 ml. of cyclohexane and 10 gm. of trimethylene sulfide, and the contents capped under a nitrogen atmosphere. The capped bottle was shaken thoroughly and 1 ml. of a 15 wt. percent solution of n-butyllithium in n-hexane was added to the bottle. The bottle was shaken again and allowed to stand for 24 hrs. at room temperature, at the end of which period a white solid polymer of trimethylene sulfide had precipitated. The bottle was opened and the polymer was removed and washed on a filter with 100 ml. of methyl alcohol. The polymer was then washed with 100 ml. of methyl alcohol in a Waring Blendor. The polymer was then filtered and dried in a vacuum oven overnight. The dried polymer, amounting to 2.6 gm., was then molded into a film at 110° C. The film, a tough, flexible material, was cut into slivers and cold drawn to a tough fiber. Two of the slivers, each measuring 0.008 in. thick by 0.133 in. wide, were pulled and found to have an average tensile strength of 3380 p.s.i. The average elongation of the polymer was 35% and it had a crystalline melting point of 65±1° C. and a Shore D hardness of 65–70.

*Example II*

A beverage bottle was charged with 500 ml. of cyclohexane and 174 gm. of trimethylene sulfide. The capped bottle, with the contents maintained under a nitrogen atmosphere, was cooled in an ice bath and then charged with a sufficient volume of a 15 wt. percent solution of n-butyllithium in n-hexane to provide 0.1 gm. butyllithium. A small amount of trimethylene sulfide polymer formed immediately. The bottle was then allowed to stand overnight. Further amounts of n-butyllithium solution were thereafter added to the bottle incrementally, with further agitation and standing of the bottle at room temperature, the total amount of the n-butyllithium catalyst charged to the bottle being 1.5 gm. The bottle was opened and the polymer was recovered by filtration and washed with cyclohexane. The polymer was then washed with methyl alcohol in a Waring Blendor. The polymer was then recovered by filtration and dried overnight under a vacuum at about 40° C. The dry polymer recovered amounted to 91.3 gm. A sample of this polymer was molded at 120° C. at 18,000 p.s.i. and allowed to cool in a mold. This molded material could be drawn and oriented and yielded a strong flexible film having a tensile strength of 41,100 p.s.i. and an elongation of 12%. The polymer had a density greater than 1.00, an inherent viscosity of 0.15, and was soluble in hot sulfolane (from which it precipitated on cooling) and hot methylsulfolane. The polymer was stable in air at elevated temperatures; for example, a sample of the polymer heated at 175° C. for 26.5 hrs. had a weightloss of only 1.6 wt. percent.

*Example III*

A beverage bottle was charged with a 100 ml. of N-methylpyrrolidone and 15 ml. of trimethylene sulfide. The capped bottle, with the contents maintained under an atmosphere of nitrogen, was then charged with 0.5 ml. of a 15 wt. percent solution of n-butyllithium in n-hexane. The bottle was allowed to stand overnight at room temperature and the contents were then poured into 500 ml. of water, causing the trimethylene sulfide polymer to precipitate. The polymer was recovered by filtration and washed twice with water and once with methyl alcohol in a Waring Blendor. The polymer was then recovered by filtration and dried under vacuum to yield 6.8 gm. of dry polymer. A film of the polymer was molded at 120° C. and it was strong and could be cold drawn and oriented. An 0.5 gm. sample of such polymer was dissolved in 100 ml. of N-methylpyrrolidone and the resulting polymer solution took 165.5 seconds to flow in a No. 100 Cannon-Fenske Kinematic Viscometer at 30° C. The time for N-methylpyrrolidone to flow through the same viscometer was 114.5 seconds. Thus, the relative viscosity of the polymer was 1.45, and the inherent viscosity was 0.74.

*Example IV*

A beverage bottle was charged with 100 ml. of cyclohexane, 9 gm. of styrene and 10 gm. of trimethylene sulfide. The capped bottle, with the contents under a nitrogen atmosphere, was charged with 2 ml. of 15 wt. percent solution of n-butyllithium in n-hexane. About 10 min. after charging the catalyst, the trimethylene sulfide/styrene copolymer started to precipitate. The bottle was allowed to stand for 5 days at room temperature. At the end of this time, the copolymer had precipitated from the cyclohexane and it was removed and dissolved in benzene. The copolymer was then recovered by evaporating the benzene off, yielding 18.1 gm. of a highly viscous, sticky trimethylene sulfide/styrene copolymer, having the following elemental analysis:

| | Wt. percent |
|---|---|
| Carbon | 69.8 |
| Hydrogen | 8.1 |
| Sulfur (mercaptan, 0.58 wt. percent), total | 22.2 |

*Example V*

An amount of 14.2 gm. of the trimethylene sulfide/styrene polymer prepared according to Example IV was placed in a flask along with 200 ml. of acetic acid. The mixture was heated in a steam bath and 20 gm. of a 30% aqueous hydrogen peroxide solution was added to the mixture while heating and stirring. After stirring for 1 hr., the mixture was allowed to stand over the weekend, after which it was stirred and heated in a steam bath for an additional 4 hrs. The flask was then charged with 5 ml. of a 15 wt. percent solution n-butylmercaptan in n-hexane to kill the remaining hydrogen peroxide. The resulting oxidized trimethylene sulfide/styrene copolymer was then filtered from the mixture and washed with water in a Waring Blendor. The recovered polymer was a white solid. It was dried under a vacuum overnight at 80° C. The dried polymer was found to be soluble in methylsulfolane and insoluble in benzene, and it had the following analysis:

| | Percent |
|---|---|
| Carbon | 55.3 |
| Hydrogen | 6.6 |
| Sulfur | 16.8 |
| Oxygen | 23.0 |

*Example VI*

In this example, a series of five polymerization runs were carried out, using the procedure of Example IV, employing varying amounts of trimethylene sulfide, styrene, and n-butyllithium. The charges for the various runs and the weight of the white, solid trimethylene sulfide/styrene polymer recovered in each run after overnight polymerization at room temperature are summarized below:

| | Runs | | | | |
|---|---|---|---|---|---|
| | 1 | 2 | 3 | 4 | 5 |
| Styrene, ml | 5 | 5 | 10 | 10 | 15 |
| Trimethylene sulfide, ml | 15 | 15 | 10 | 10 | 5 |
| n-Butyllithium solution (15 wt. percent in n-hexane), ml | 0.5 | 1.0 | 0.5 | 1.0 | 0.5 |
| Wt. of polymer, gm | 11 | 7.1 | 2.3 | 7.3 | 6.0 |

Various modifications and alterations of this invention will become apparent to those skilled in the art without departing from the scope and spirit of this invention, and it should be understood that this invention is not to be limited unduly to that set forth herein for illustrative purposes.

I claim:

1. A process for preparing a polymer of a trimethylene sulfide, which comprises contacting said trimethylene sulfide in a polymerization zone under a pressure sufficient to maintain said trimethylene sulfide in the liquid phase and at a temperature within the range of −80 to 150° C. with a catalytic amount of an organo-alkali metal polymerization catalyst, and recovering the resulting polymer from the reaction mixture.

2. A process for preparing a polymer of a trimethylene sulfide having the general formula

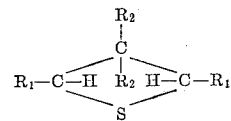

where $R_1$ and $R_2$ are radicals selected from the group consisting of hydrogen, alkyl, aryl, and cycloalkyl radicals, and combinations of such radicals, which comprises contacting a solution of said trimethylene sulfide in a solvent therefor in a polymerization zone under a pressure sufficient to maintain the trimethylene sulfide in the liquid phase and at a temperature within the range of 0 to 75° C. with an organo-alkali metal polymerization catalyst having the general formula $R'M_n$, where $R'$ is an organo radical, M is an alkali metal in an amount ranging from 0.25 to 100 millimoles per 100 grams of said trimethylene sulfide monomer, and $n$ is an integer from 1 to 4, and recovering the resulting polymer from the reaction mixture.

3. The process according to claim 2, wherein said $R_1$ and $R_2$ are hydrogen.

4. The process according to claim 3, wherein said catalyst is n-butyllithium.

5. A process for preparing a polymer of a trimethylene sulfide and a polymerizable vinyl-substituted comonomer, which comprises contacting said trimethylene sulfide and said vinyl-substituted comonomer in a polymerization zone under a pressure sufficient to maintain the trimethylene sulfide and vinyl-substituted comonomer in the liquid phase and at a temperature within the range of −80 to 150° C. with a catalytic amount of an organo-alkali metal polymerization catalyst wherein the polymer comprises 10–90 weight percent trimethylene sulfide and the balance being the comonomer, and recovering the resulting polymer from the reaction mixture.

6. A process for preparing a polymer of a trimethylene sulfide having the general formula

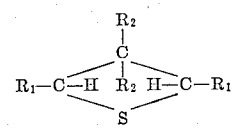

where $R_1$ and $R_2$ are radicals selected from the group consisting of hydrogen, alkyl, aryl and cycloalkyl radicals, and combinations of such radicals and a polymerizable vinyl-substituted comonomer selected from the group consisting of conjugated dienes and compounds having the general formula

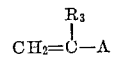

where $R_3$ is selected from the group consisting of hydrogen, lower alkyl and chloro, and A is selected from the group consisting of carboxy, cyano, carbamyl, carboalkoxy and the radicals:

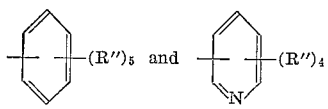

where R'' is selected from the group consisting of hydrogen, vinyl, halogen and lower alkyl, which comprises contacting a solution of said trimethylene sulfide and said vinyl-substituted comonomer in a solvent therefor in a polymerization zone under autogenous pressures and a temperature ranging from 0 to 75° C. and with an organoalkali metal polymerization catalyst having the general formula $R'M_n$, where R' is an organo radical, M is an alkali metal, and $n$ is an integer from 1 to 4, in an amount ranging from 0.25 to 100 millimoles per 100 grams of the trimethylene sulfide charged to said zone and wherein the polymer comprises 10–90 weight percent trimethylene sulfide and the balance being the comonomer and recovering the resulting polymer from the reaction mixture.

7. The process according to claim 6, wherein said $R_1$ and $R_2$ are hydrogen.

8. The process according to claim 7, wherein said vinyl-substituted comonomer is styrene.

9. The process according to claim 8, wherein said catalyst is n-butyllithium.

10. A polymer of a trimethylene sulfide and a vinyl-substituted comonomer.

11. A polymer of a trimethylene sulfide having the general formula

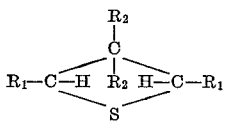

where $R_1$ and $R_2$ are radicals selected from the group consisting of hydrogen, alkyl, aryl and cycloalkyl radicals, and combinations of such radicals and a polymerizable vinyl-substituted comonomer selected from the group consisting of conjugated dienes and compounds having the general formula

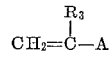

where $R_3$ is selected from the group consisting of hydrogen, lower alkyl and chloro, and A is selected from the group consisting of carboxy, cyano, carbamyl, carboalkoxy and the radicals:

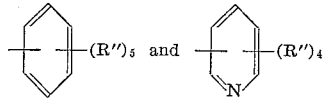

where R'' is selected from the group consisting of hydrogen, vinyl, halogen and lower alkyl wherein the polymer comprises 10–90 weight percent trimethylene sulfide and the balance being the comonomer.

12. A polymer according to claim 11, wherein said $R_1$ and $R_2$ are hydrogen.

13. A polymer according to claim 11, wherein said vinyl-substituted comonomer is styrene.

References Cited
UNITED STATES PATENTS 3,222,326　12/1965　Brodoway _____ 260—79.7
3,225,120　12/1965　Baker _____ 260—79.3

OTHER REFERENCES

Tarbell et al., Chem. Reviews, vol. 49; August-December 1951, page 22 relied on.

JOSEPH L. SCHOFER, *Primary Examiner.*

D. K. DENENBERG, *Assistant Examiner.*